United States Patent [19]

Hehl

[11] Patent Number: 4,846,652
[45] Date of Patent: Jul. 11, 1989

[54] COMBINATION OF AN INJECTING UNIT AND PLASTICIZING UNIT FOR AN INJECTION MOLDING MACHINE

[76] Inventor: Karl Hehl, Arthur-Hehl-Str. 32, D-7298 Lossburg 1, Fed. Rep. of Germany

[21] Appl. No.: 258,713

[22] Filed: Oct. 17, 1988

[30] Foreign Application Priority Data

Oct. 22, 1987 [DE] Fed. Rep. of Germany ....... 3735701

[51] Int. Cl.$^4$ ............................................. B29C 45/62
[52] U.S. Cl. ................................. 425/190; 425/192 R; 425/574
[58] Field of Search ........... 425/182, 185, 190, 192 R, 425/574

[56] References Cited

U.S. PATENT DOCUMENTS 4,704,078 11/1987 Hehl ..................................... 425/185

Primary Examiner—Richard L. Chiesa
Assistant Examiner—Timothy W. Heitbrink
Attorney, Agent, or Firm—Spencer & Frank

[57] ABSTRACT

An apparatus for locking a horizontal plasticizing cylinder to the carrying block of the injecting unit of an injection molding machine having two cylinder-locking sliders which are disposed on opposite sides of the axis of said cylinder and are radially movable by means of hydraulic cylinders. In a locking position, the sliders extend in diametrically opposite recesses of the plasticizing cylinder. A shaft for driving the feed screw of the plasticizing unit has a coupling section which is formed with a radial guide groove, in which a screw-locking slider is radially displaceably mounted, the screw-locking slider being non-rotatably connected to the shaft. A coupling bridge is secured to the upper one of the cylinder-locking sliders. When the feed screw is in a desired angular position said coupling bridge is coupled to the screw-locking slider so that one cylinder-locking slider and the screw-locking slider are simultaneously moved to their locking positions.

18 Claims, 5 Drawing Sheets

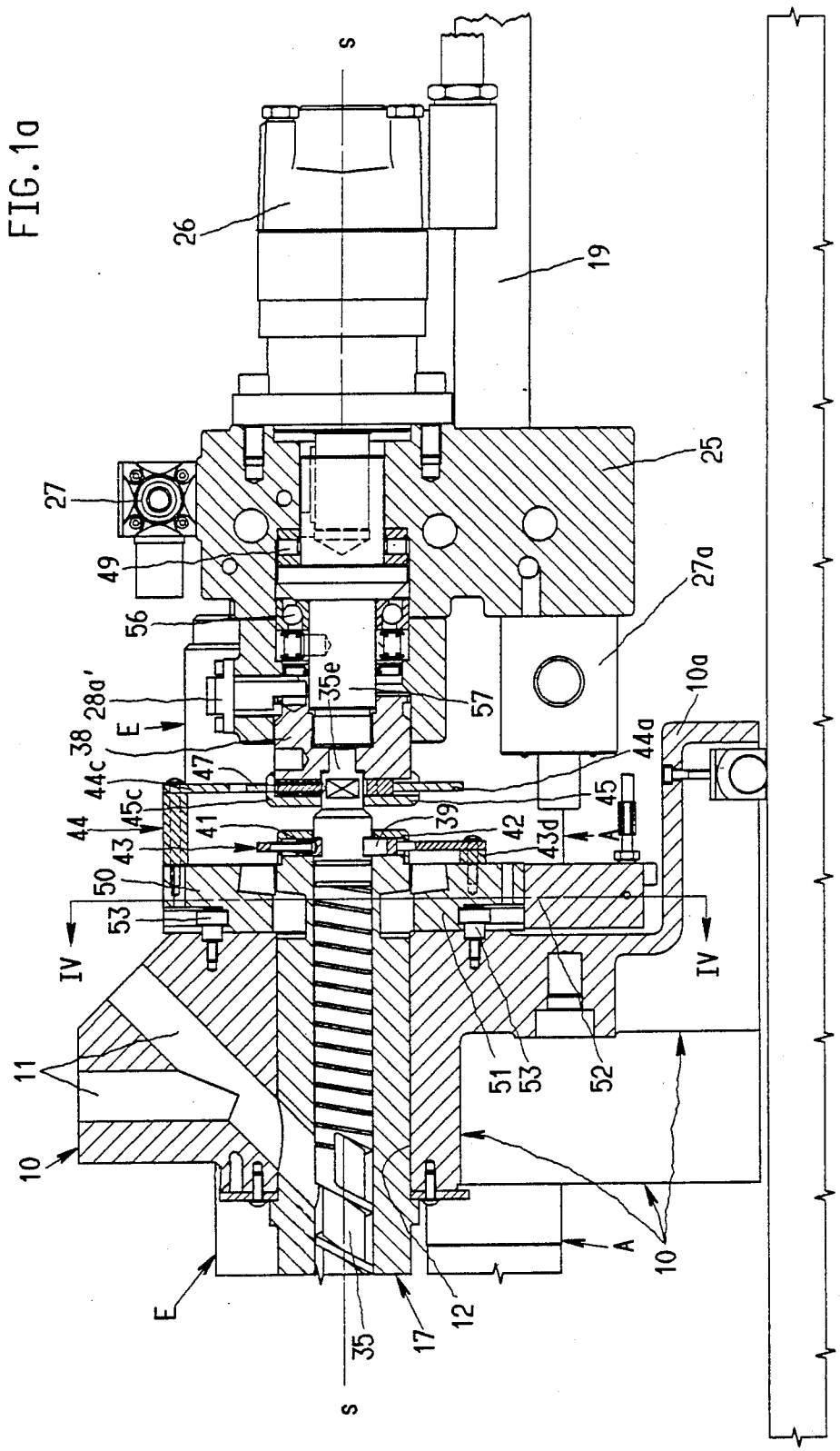

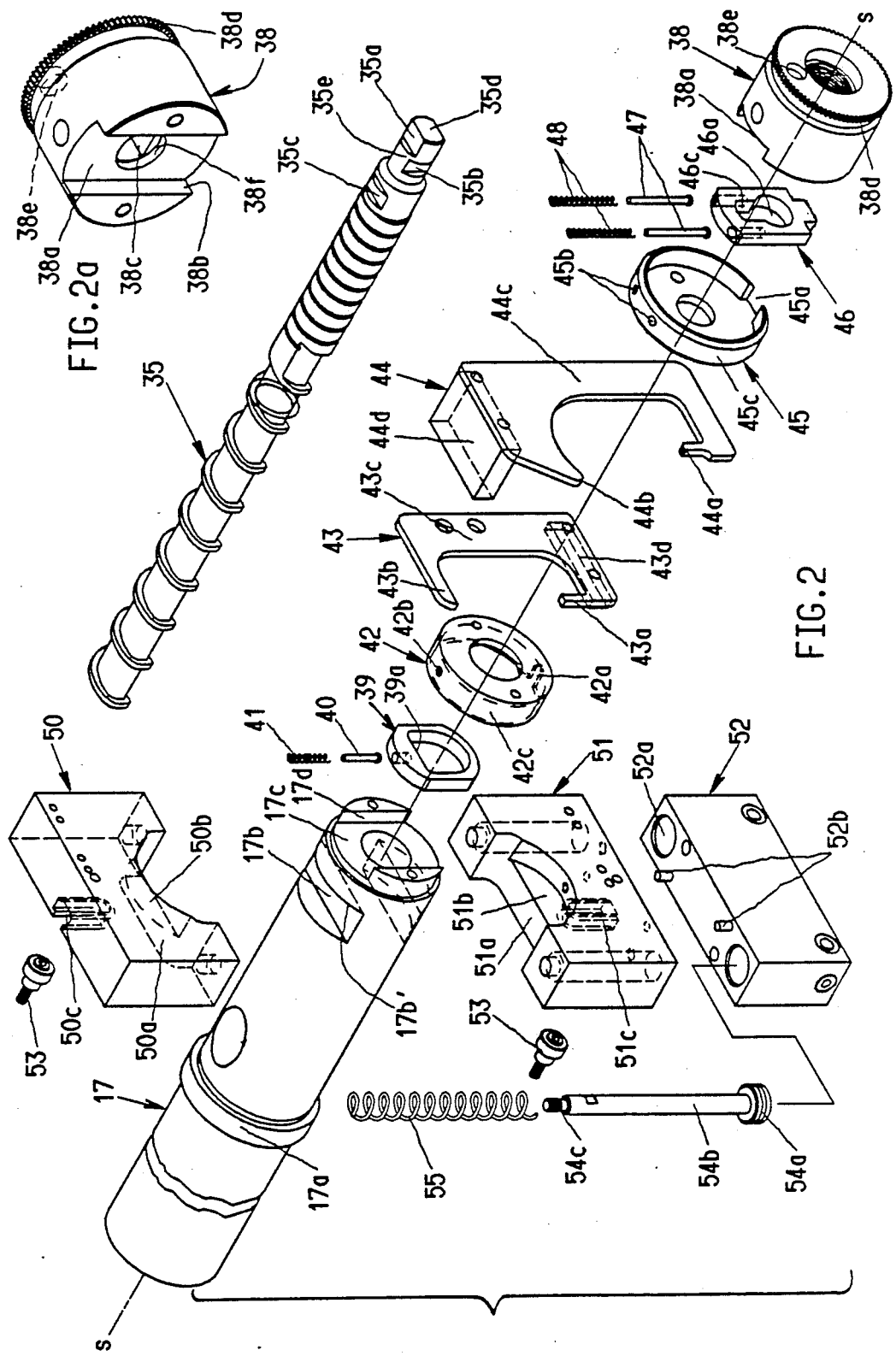

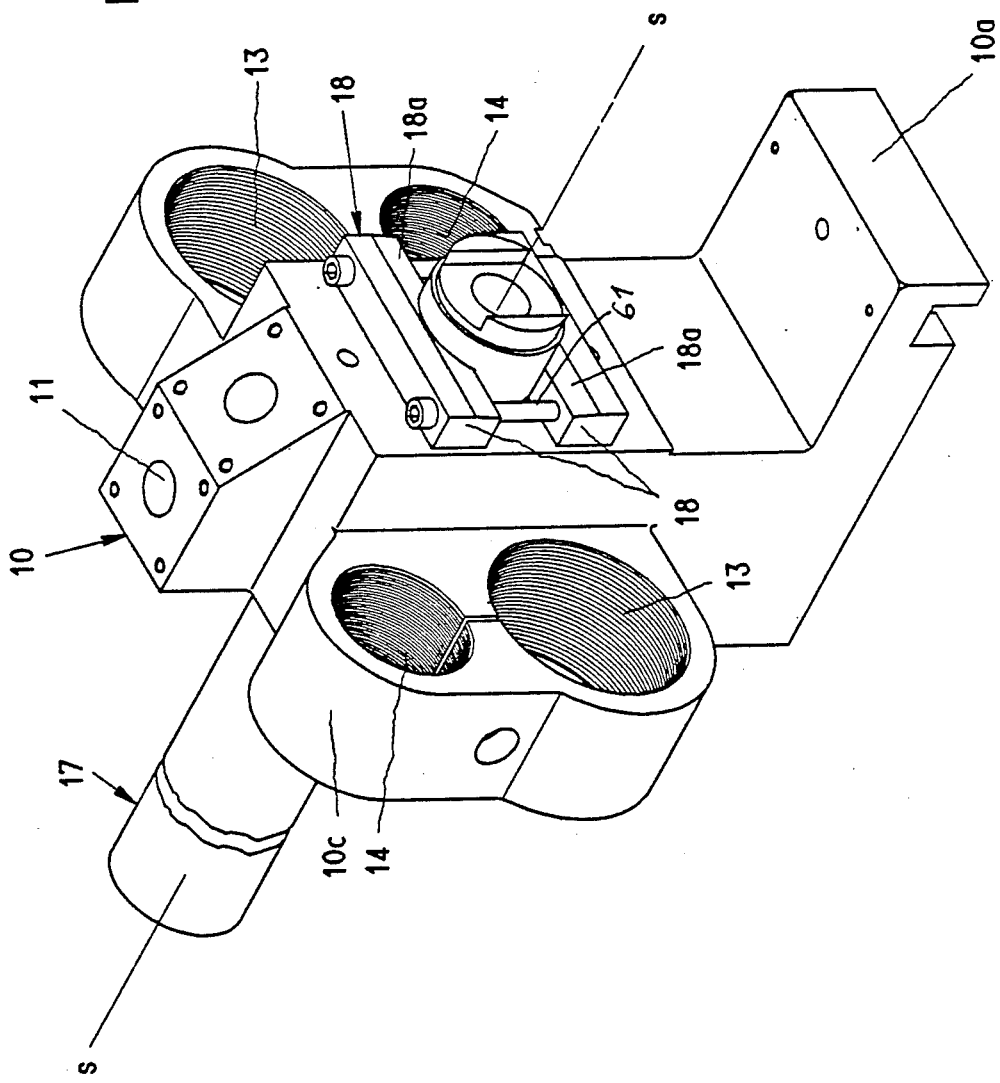

COMBINATION OF AN INJECTING UNIT AND PLASTICIZING UNIT FOR AN INJECTION MOLDING MACHINE

BACKGROUND OF THE INVENTION

1. Field of the Invention

This invention relates to an injecting unit provided with a locking apparatus for a program-controlled simultaneous locking of a plasticizing cylinder to a carrying block and for simultaneously locking a feed screw to a screw-driving shaft. Said feed screw comprises a profiled coupling portion, which is adapted to be coupled to a coupling section of the screw-driving shaft. The feed screw is axially displaceable by hydraulic injecting cylinders for effecting an injection of plastic sliders, which are disposed on opposite sides of the axis of the plasticizing cylinder and are radially guided on the carrying block and by means of at least one hydraulic unlocking cylinder are adapted to be radially displaced from a locking position to an unlocking position. A screw-locking slider is radially guided on and non-rotatably connected to the coupling section and is adapted to assume a desired angular position, in which the screw-locking slider is adapted to lock the feed screw to the screw-driving shaft and in said desired angular position is adapted to be displaced by said unlocking cylinder from a locking position to an unlocking position, which desired angular position is adapted to be determined by means of a position control device for arresting the screw-driving motor.

The "desired angular position" is that angular position in which the feed screw is to be arrested and in which the feed screw can be locked to the screw-driving shaft in the course of a program-controlled exchange of a plasticizing unit which comprises the plasticizing cylinder and the feed screw.

2. Description of the Prior Art

An injecting unit of the kind described first hereinbefore is disclosed in U.S. Pat. No. 4,704,078. In that injecting unit the hydraulic unlocking cylinder for controlling the cylinder-locking sliders and the screw-locking sliders acts through at least one spreading wedge onto two screw-locking sliders, which are disposed on opposite sides of the axis of the feed screw. For an unlocking movement the spreading wedge moves in between the two screw-locking sliders and moves the same out of their locking position in tracks at right angles to the axis of the hydraulic unlocking cylinder. That design requires relatively expensive tracks in a separate housing for the screw-locking sliders.

SUMMARY OF THE INVENTION

In view of that prior art it is an object of the invention to provide an injecting unit which is of the kind described first hereinbefore and which permits an improved automatic exchange of the plasticizing unit and also an improved series manufacture and assembly, particularly if parts are subsequently added to an existing injection molding machine or the coupling device is to be replaced for repairs.

In accordance with the invention that object is accomplished in that a coupling bridge is secured to one of the cylinder-locking sliders and is arranged to engage the screw-locking slider for a joint locking movement of the cylinder-locking slider and the screw-locking slider when the latter is in the desired angular position.

Said features are based on the concept that the radial movement of a slider for locking and unlocking the plasticizing cylinder can directly be transformed to a corresponding movement of the screw-locking slider for locking or unlocking the feed screw because one cylinder-locking slider is provided with a coupling member which is engageable with the screw-locking slider when the latter is in the desired angular position.

The screw-locking slider can be designed, guided and controlled in a very simple manner if the same is annular and receives the end section of the feed screw and is adapted to be coupled to one cylinder-locking slider by coupling means which engage the screw-locking slider on two mutually opposite sides.

The feed screw will axially be locked with a high reliability if the screw-locking slider is adapted to be moved against the force of springs to an unlocking position by the cylinder-locking slider as the latter moves to its unlocking position and said springs urge the screw-locking slider to its locking position.

The opening formed in the screw-locking slider and receiving the end section of the feed screw suitably consists of a keyholelike pilot opening, which has such a basic configuration that the end section of the feed screw will extend through the pilot opening so as to be rotatable therein when the screw-locking slider is in its unlocking position and that the feed screw will axially and radially be fixed in the pilot opening to the screw-locking slider when the latter is in its locking position.

An additional slider may be provided and may be coupled for a locking movement to that of the cylinder-locking sliders which is not coupled to the screw-locking slider and this may be effected in the same manner. That additional slider is guided on the plasticizing cylinder and will serve to axially lock the feed screw in the plasticizing cylinder when the same is disposed outside the injecting unit, particularly when the plasticizing unit is to be replaced.

The locking apparatus associated with the injecting unit may constitute a unit, which can be installed into the injecting unit in a very simple manner, particularly as a subsequently installed attachment, and may be kept in stock as such unit and may be replaced as such unit for repairs.

Owing to its open design, the arrangement in accordance with the invention permits a checking at a glance whether the sliders are in or out of their locking position.

Finally, the proposed design permits the provision of an injecting unit having an extremely short length.

In a locking apparatus which constitutes such a unit the cylinder-locking sliders may be interconnected by two hydraulic cylinders having cylinders proper which are constituted by bores formed in one of the cylinder-locking sliders whereas the piston rods of such cylinders are secured to the other of the cylinder-locking sliders and the cylinder-locking sliders are guided on guide pins, which are secured to the carrying block and have heads extending into guide grooves formed in the cylinder-locking sliders. In that case it will depend on the frictional resistances in the guide grooves of the cylinder-locking sliders whether an actuation of the hydraulic cylinder will cause one or the other cylinder-locking slider to move to its locking position first or whether the movement of the two cylinder-locking sliders will overlap in time. As a rule, said frictional resistances in the guides of the two sliders will not be equal so that the cylinder-locking sliders will not be moved out of their locking position at the same time, as a rule. Similar remarks are applicable to the movement of the cylinder-locking sliders to their locking position under the action of springs. The unit which comprises the two cylinder-locking sliders, the associated hydraulic cylinders, and the associated coupling bridges coupled to the screw-locking slider and the additional sliders can be checked for its operative conditions even outside the injecting unit and can be installed in and removed from the injecting unit with an extremely small assembling expenditure. As a result, a customer may initially purchase the injecting unit only with a very simple mechanical coupling device at low cost and may replace the mechanical coupling device by a hydraulic coupling device at a later time because all connecting means which are required for a change or replacement or a subsequent installation in the mechanical and hydraulic coupling devices are identical.

BRIEF DESCRIPTION OF THE DRAWING

FIG. 1a is a view that is similar to FIG. 1 but shows the arrangement when the plasticizing cylinder and the feed screw are unlocked.

FIG. 2 is an enlarged perspective view of the coupling device of the injecting unit.

FIG. 2a is a perspective view of the coupling member of FIG. 2 viewed in a different direction.

FIG. 5 shows the carrying block of the injecting unit provided with a plasticizing cylinder which has axially and radially been locked by a mechanical locking apparatus.

DETAILED DESCRIPTION OF THE PREFERRED EMBODIMENT

Figure 1:
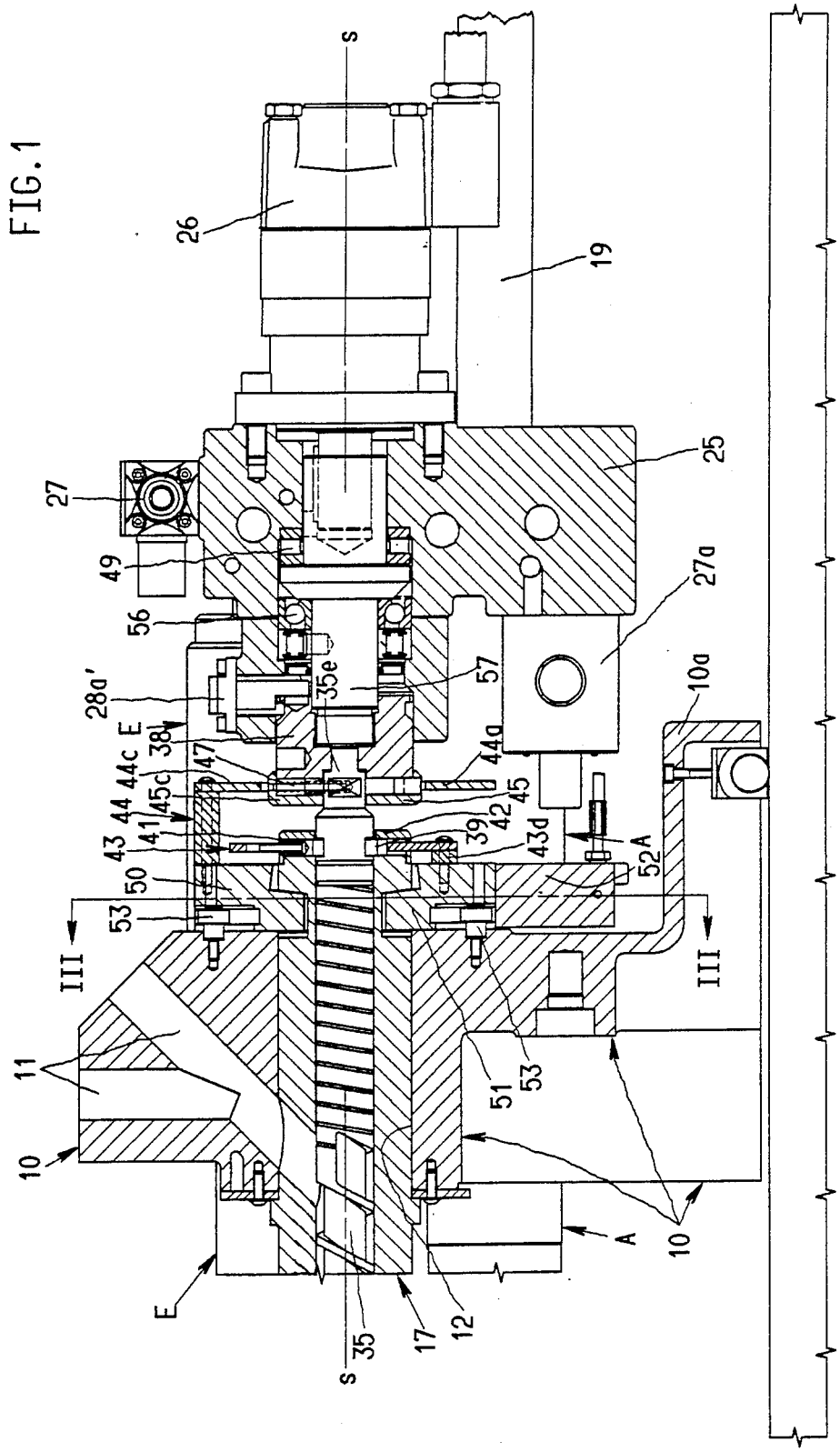
FIG. 1 is a side elevation showing partly in a vertical section through the injection axis the injecting unit provided with the coupling device when the plasticizing cylinder and the feed screw are locked.

An illustrative embodiment of the invention will now be described more in detail with reference to the drawing.

The injecting unit which is provided with the locking apparatus comprises a carrying block 10, which receives the plasticizing cylinder 17 and is formed with feed passages 11 for the plastic material.

As is apparent from FIG. 5 in conjunction with FIGS. 1 and 1a, bores 14 formed in the carrying block 10 are adapted to receive hydraulic advance-retract cylinders A for axially displacing the injecting unit on guide rods 19. The pistons of the advance-retract cylinders A are secured to the guide rods 19. The cylinders proper of the advance-retract cylinders A and the carrying block 10, i.e., the injecting unit, constitute a unit which is movable into and out of engagement with the injection mold. Additional bores 13 in the block 10 contain hydraulic injecting cylinders E for axially actuating the rotatable feed screw 35 which is contained in the plasticizing cylinder 17. The two bores 14 for the advance-retract cylinder A are diagonally spaced apart in the carrying block 10 and so are the two bores 13 for the injecting cylinders E. This is particularly apparent from FIG. 5. An injecting bridge 25 provided with a shut-off valve 27 and a variable throttling valve 27a is secured to the injecting cylinders E at their ends and connects the injecting cylinders to each other and to the feed screw for the performance of an axial injecting stroke. The screw-driving motor 26 is secured to the injecting bridge 25 at its rear and via a screw-driving shaft 57 having a coupling section 38 imparts a rotation to the feed screw 35. The screw-driving shaft 57 is mounted in an axial bearing 49 and a radial bearing 56. The carrying block 10 is supported on the pedestal of the injection molding machine by a portion 10a which is integrally formed with the carrying block 10 at its rear end by rolling elements.

Cylinder-locking sliders 50; 51, 52 are disposed on opposite sides of the axis of the plasticizing cylinder 17 and in sliding contact with the planar rear face of the carrying block 10 and are guided in the vertical longitudinal plane of symmetry of the injecting unit on guide pins 53, which are anchored in the carrying block 10 and received by radial guide grooves 50c, 51c formed in the sliders 50; 51.

The guide groove 50c formed in the upper slider 50 has an open end at the top edge of the slider 50. The lower slider 51, 52 consists of an outer slider part 52 formed with blind bores 52a and an inner slider part 51 formed with blind bores 52a', which are smaller in inside diameter than and coaxial to the bores 52a. The guide groove 51c formed in the inner slider part 51 terminates at the bottom edge of the part 51 and is covered at its bottom end by the outer slider part 52. The bores 52a in the outer slider part 52 constitute the cylinder chambers of hydraulic unlocking cylinders Z. The piston rods 54b of the hydraulic cylinders Z extend through the bores 52a' in the inner slider part 51 and are secured to the upper slider 50 by means of screw-threaded end portions 54c. The outer slider part 52 is connected by fixing screws 62 to the inner slider part 51 and is centered thereon by centering pins 52b. In the illustrative embodiment shown the hydraulic cylinders Z are single-acting unlocking cylinders. Coil springs 55 are disposed in the blind bores 52a' of the inner slider part 51 and surround the piston rods 54b. The springs 55 bear at one end on shoulders 60 in the bores 52a' of the inner slider part 51 and at the other end on the rear ends of the pistons 54a. The mode of operation of the cylinder-locking sliders 50; 51, 52 will now be explained with reference to FIGS. 3 and 4. In the position shown in FIG. 3 the springs 55 hold the sliders 51, 52; 50 in a locking position, in which the segment-shaped engaging portions 50a; 51a (FIG. 2) of the sliders interlock with diametrically opposite locking grooves 17b formed in the plasticizing cylinder 17. The pistons 54a are now at the bottom end of the bore 52a. In the unlocking position shown in FIG. 4 the sliders 50 and 51, 52 have been moved apart as far as possible by an actuation of the pistons 54a, which are now at the top end of the bores 52a. The plasticizing cylinder has now been unlocked for an axial movement relative to the carrying block 10.

Figure 3:
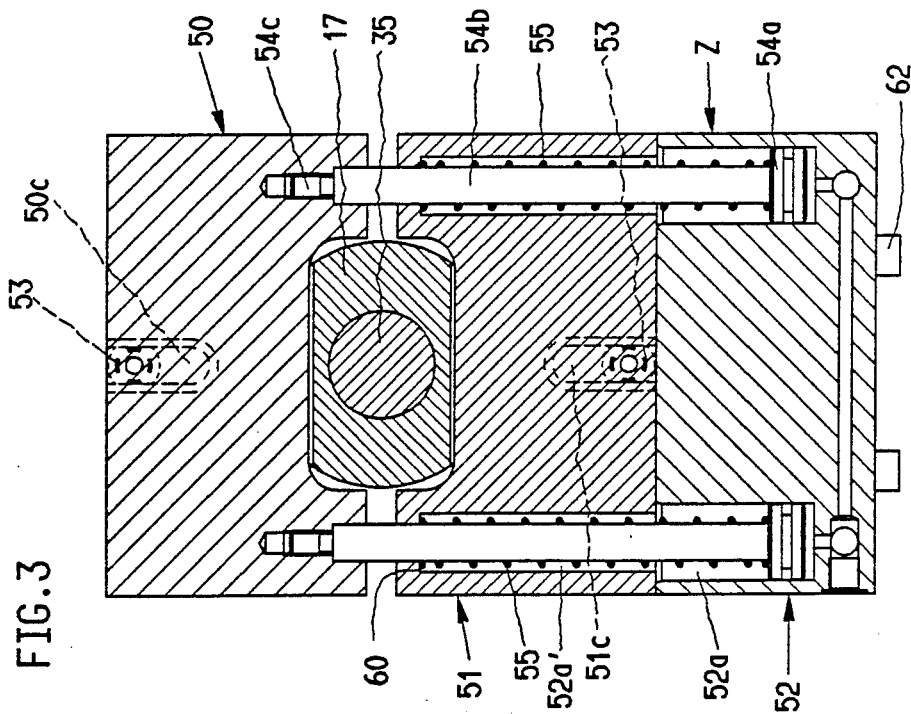

As is apparent from FIG. 3 in conjunction with FIG. 1, beveled surfaces 50b; 51b of the segment-shaped engaging portions 50a; 51a (FIG. 2) bear on mating beveled surfaces 17b' of the locking grooves 17b of the plasticizing cylinder 17 when the latter is locked. The plasticizing cylinder 17 is a sliding fit in a central axial bore 12 (FIGS. 1, 1a) of the carrying block 10. Owing to the cooperation of the beveled surfaces 50b, 51b of the sliders 50; 51, 52 with the mating beveled surfaces 17b' of the plasticizing cylinder the locked plasticizing cylinder 17 is axially clamped in the carrying block 10 because a radial flange 17a of the plasticizing cylinder 17 is axially forced against the forward end face of the carrying block 10.

Figure 4:
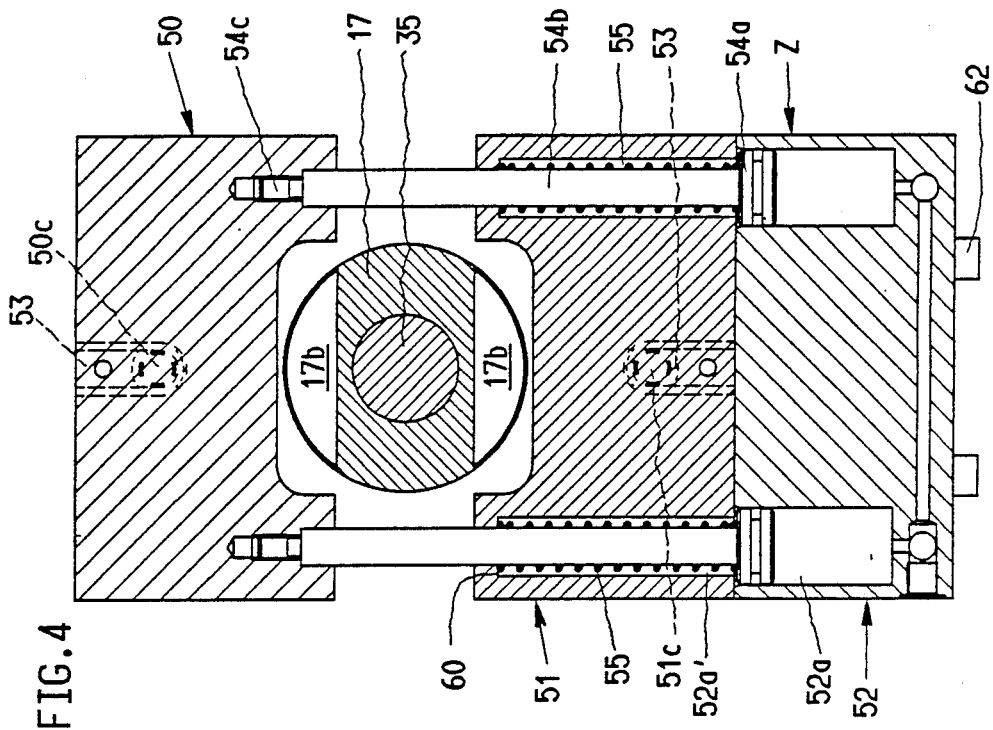
FIGS. 3 and 4 are sectional views taken on lines III—III and IV—IV, respectively, in FIGS. 1 and 2.

When the plasticizing cylinder 17 has been unlocked as shown in FIG. 4 and has axially been retained by means not shown, the plasticizing cylinder can be moved out of the central bore 12 of the carrying block 10 in that the advance-retract cylinders A are operated to impart a limited rearward movement to the block. The plasticizing cylinder can then be carried away for a replacement.

The feed screw 35 has a profiled coupling portion, which is formed with flats 35a (FIG. 2) and is received by a socket 38c of the coupling section 38 of the drive shaft 57 for a radial coupling. When the feed screw has been fitted into the coupling section 38, a cylindrical portion 35e of the feed shaft is centered on an annular shoulder 38f (FIG. 2a).

A position control device for arresting the screw-driving motor 26 is adapted to arrest the feed screw 35 in a desired angular position. The position control device comprises a stationary sensor 28' (FIGS. 1, 1a) and a rotary pulse generator 38e (FIG. 2), which causes the sensor 28a' to deliver inductively generated pulses in response to the rotation of the coupling section 38. Teeth 38d formed on the coupling section 38 permit an inductive speed measurement by means of the stationary sensor 28a'. In the illustrative embodiment shown the rotatable screw-locking slider 46 is displaceable in a vertical direction. As is apparent from FIGS. 1 and 1a in conjunction with FIG. 2, a coupling bridge 44 is secured to the upper cylinder-locking slider 50 and comprises a flat coupling claw 44c, which is transverse to the injecting axis s-s and is connected by a spacer 44d to the cylinder-locking slider 50. The coupling claw 44c of the coupling bridge 44 engages the screw-locking slider 46 on two mutually opposite sides for a synchronous actuation. The slider 46 is engageable from below by a nose 44a of the coupling claw 44c and from above the engagement of an engaging edge portion 44b of the coupling claw with pins 47 projecting from the slider 46. The screw-locking slider has a pilot opening 46a, which receives the profiled coupling portion of the feed screw. This means that the screw-locking slider is annular, as is particularly apparent from FIG. 2. Besides, the screw-locking slider 46 is non-rotatably connected to the shaft 57 in that the slider 46 is slidably fitted in a radial guide groove 38a, which is formed in the coupling section 38 and is formed with a guiding side face 38b (FIG. 2a) and covered by a cover 45. The cover 45 has an axial flange 45c, which overlaps the coupling section 38. When the feed screw 35 is unlocked (FIG. 1a), the nose 44a extends in an opening 45a of the cover 45 over the axial flange 45c of the cover. The pins 47 are received in blind bores of the screw-locking slider 46 and extend through holes 45b in the axial flange 45c. The movement to the unlocking position is transmitted to the screw-locking slider 46 by the coupling bridge 44 against the action of springs 48, by which the screw-locking slider 46 is urged to its locking position as the cylinder-locking slider 50 performs a locking movement.

The keyholelike pilot opening 46a comprises a bottom portion which corresponds in diameter to the end section 35d of the feed screw 35, and a narrower top portion, which is defined by engaging side faces 46c of the screw-locking slider 46. When the slider 46 is in locking position the locking side faces are received by diametrically opposite openings 35b formed in the end section 35d. Said openings are defined by vertical flats 35e, which are at right angles to the flats 35a of the profiled coupling portion. In that locking position the center of gravity of the screw-locking slider 46 is eccentric to the injection axis s-s. As a result, the centrifugal forces exerted during a rotation of the feed screw will tend to hold the screw-locking slider in its locking position. As is apparent from FIGS. 1, 1a, 2 the coil springs 48 bear on the axial flange 45c of the cover 45 and the bottom of the blind bores which receive the pins 47 so that the screw-locking slider 46 is urged to its locking position. It is apparent that the movement of the screw-locking slider to its locking position is ensured by a plurality of mutually independent actions, which are exerted by the springs 48, by the coupling bridge 44 and pins 47, and by the centrifugal force generated during a rotation of the feed screw. Alternatively, the screw-locking slider 46 might be moved to its locking position only by the springs 48 or only as a result of the synchronous drive of the screw-locking slider 46 by the upper cylinder-locking slider 50. During a rotation of the feed screw 35, the coupling elements of the coupling bridge 44, namely, the nose 44a and particularly the edge 44b of the coupling claw 44c, will slightly be spaced from the screw-locking slider 46 and from the pins 47 which rotate with said slider and protrude from the axial flange 45c so that undesired chafing and grinding actions will be avoided. That distance from the nose 44a to the screw-locking slider 46 when the feed screw is locked is apparent from FIG. 1 just as the distance from the edge 44b of the coupling claw 44c from the pins 47. If that safety distance between the edge 44b and the pins 47 is not inherently provided, that safety distance will automatically be provided by a corresponding curvature of the edge 44b, which is so designed that the beginning of the rotation of the feed screw 35 will cause the pins 47 to run up on the edge 44b so as to effect a slight spacing. The locking apparatus for a simultaneous locking of the plasticizing cylinder 17 and the feed screw 35 comprises further locking means for a synchronous locking of the feed screw in the plasticizing cylinder as the latter is unlocked. By that locking action the feed screw will axially and radially be held in position in the plasticizing cylinder particularly for a transport outside the injecting unit.

For this purpose a further slider 39 is mounted for a limited radial displacement in a rear guide groove 17c, which is formed in the plasticizing cylinder 17 and has guiding side faces 17d. When the cylinder-locking sliders 50; 51, 52 are in unlocking position the additional slider is urged by a spring 41 to a position in which the engaging side face 39a of the slider 39 interlocks with a mating opening 35c of the feed screw 35. The opening 35c is defined by a flat of the otherwise cylindrical end section 35d. That flat is parallel to the flat 35a of the profiled coupling portion. The guide groove 17c is covered by a cover 42, which has an axially extending flange 42c, which overlaps the rear end of the plasticizing cylinder 17. A coupling bridge 43 is secured to the lower cylinder-locking slider 51, 52 and bears on the additional slider 39 in such a manner that the cylinder-locking slider and the additional slider will move almost in synchronism. The coupling bridge 43 comprises a coupling claw 43c, which is connected by a spacing bar 43d to the cylinder-locking slider 51, 52. The coupling claw 43c is coupled to the additional slider 39 by interengaging therewith on two mutually opposite sides. The additional slider 39 is formed with a central aperture, which receives the coupling end section 35d of the feed screw 35. The additional slider 39 is formed with a central aperture, which receives the coupling end section 35d of the feed screw 35. The additional slider 39 is engageable from below by a nose 43a of the coupling claw 43c, which nose 43a extends into an opening 42a in the flange 42c, and from above by a leg 43b of the coupling claw 43c, which leg engages a pin 40. As a result, the additional slider 39 is coupled to the cylinder-locking slider 51, 52. The additional slider 39 is also annular and during an unlocking movement of the cylinder-locking slider 51, 52 and of the coupling bridge 43 is urged to a locking position by a coil spring 41. In that locking position the additional slider 39 extends into the opening 35c formed in the coupling end section of the feed screw 35. The coil spring 41 bears on the axial flange 42c of the cover 42 and surrounds the pin 40, which is received in a blind bore of the additional slider 39 and extends through a hole 42b of the axial flange 42c.

In accordance with FIG. 5 the plasticizing cylinder 17 is locked in the carrying block 10 by a mechanical locking apparatus, which comprises two locking bars 18, which can be forced toward each other in locking position by two screws 61. The engaging portions 18a of said locking bars 18 are identical to the locking portions 50a, 51a of the cylinder-locking sliders 50; 51, 52 of the hydraulic locking apparatus provided in accordance with the invention. As a result, the mechanical locking apparatus and the hydraulic locking apparatus can be interchanged even by only slightly skilled labor and with a very low assembling expenditure, for instance, when a customer initially purchases the injecting unit together with an inexpensive mechanical locking apparatus and replaces that locking apparatus by the hydraulic locking apparatus at a later time.

I claim:

1. In a combination of an injecting unit and a plasticizing unit for use in an injection molding machine, wherein
    said plasticizing unit comprises a plasticizing cylinder having a longitudinal axis and a feed screw having a longitudinal axis, said feed screw being rotatably and axially movably mounted in said plasticizing cylinder, said feed screw having an end section formed with a profiled coupling portion,
    a screw-driving shaft having a coupling section adapted to be non-rotatably coupled to and uncoupled from said profiled coupling portion, a screw-driving motor for rotating said screw-driving shaft, and two hydraulic injecting cylinders for axially displacing said feed screw,
    said injecting unit comprising a carrying block having an axial bore for receiving and supporting said plasticizing cylinder, and
    a locking apparatus being provided for locking said plasticizing cylinder to said carrying block and for non-rotatably locking said feed screw to said screw-driving shaft, said locking apparatus comprising
    two cylinder-locking sliders disposed on opposite sides of the longitudinal axis of said plasticizing cylinder and, said cylinder-locking sliders being radially guided on said carrying block for a movement between a locking and an unlocking position relative to said plasticizing cylinder,
    hydraulic unlocking cylinder means for imparting to said cylinder-locking sliders a radial unlocking movement to said unlocking position,
    a screw-locking slider being nonrotatably connected to and guided on said coupling section for a radial movement between a locking and an unlocking position for locking the profiled coupling portion of said feed screw to said screw-driving shaft and for unlocking said feed screw, said screw-locking slider being rotatable to a desired angular position,
    coupling means being operable by said unlocking cylinder means to impart to said screw-locking slider an unlocking movement to said unlocking position of said screw-locking slider in synchronism with said unlocking movement of said cylinder-locking sliders, and
    position control means being provided for arresting said screw-driving motor when said screw-locking slider is in said desired angular position,
    the improvement residing in that said coupling means comprises a coupling bridge being secured to one of said cylinder-locking sliders and adapted to be coupled to said screw-locking slider when said screw-locking slider is in said angular position so as to couple said screw-locking slider to said one cylinder-locking slider for a simultaneous movement to their respective locking positions.

2. The improvement set forth in claim 1, wherein coil springs are provided for opposing said movement of said screw-locking slider from said locking position to said unlocking position and for urging said screw-driving slider to said locking position.

3. The improvement set forth in claim 1, wherein
    said feed screw is formed with at least one recess being adapted to receive said screw-locking slider.

4. The improvement set forth in claim 1, wherein
    said coupling section is formed with a radial guide groove,
    said screw-locking slider being guided in said radial guide groove and
    said guide groove is covered by a cover having an axial flange overlapping said coupling section beyond said guide groove.

5. The improvement set forth in claim 4, wherein
    said coupling bridge comprises a coupling claw for engaging with said screw-locking slider on two mutually opposite sides,
    said screw-locking slider being formed with a pilot opening receiving said end section of said feed screw,
    said guide groove being disposed at the bottom of said end section when said screw-locking slider is in said desired angular position,
    said cover being formed with an opening,
    said coupling claw having a nose for moving through said opening into engagement with said end section when said screw-locking slider is in said desired angular position,
    said screw-locking slider being provided with blind bores being disposed at the top of said screw-locking slider when said screw-locking slider is in said desired angular position,
    said blind bores contain pins, and
    said coupling claw comprises an engaging edge portion for engaging said pins when said screw-locking slider is in said desired angular position.

6. The improvement set forth in claim 5, wherein
    said axial flange is formed with holes and
    said pins extend through said holes.

7. The improvement set forth in claim 5, wherein coil springs are provided which surround said pins and oppose said movement of said screw-locking slider from said locking position to said unlocking position and for urging said screw-locking slider to said locking position.

8. The improvement set forth in claim 5, wherein
said end section of said feed screw comprises a cylindrical portion,
said pilot opening being keyholelike and having a cylindrical lower portion, which conforms in diameter to said cylindrical portion of said feed screw, said pilot opening further having an upper portion having a width which is smaller than the diameter of said lower portion,
said feed screw being formed with diametrically opposite recesses,
said screw-locking slider being formed with locking edge portions which define said upper portion and are adapted to enter said recesses of said feed screw, and
said screw-locking slider having a center of gravity which is offset from the longitudinal axis of said feed screw when said screw-locking slider is in said locking position.

9. The improvement set forth in claim 8, wherein
said profiled coupling portion of said feed screw is defined by flats,
said diametrically opposite recesses of said end section are axially spaced from said flats,
said end section of said feed screw having a cylindrical portion between said diametrically opposite recesses and said flats,
said coupling section of said screw-driving shaft comprising an annular shoulder for cooperating with said cylindrical portion so as to center said end section relative to said coupling section, and
said position control means are arranged to arrest said screw-driving motor when said feed screw is in a desired angular position in which said diametrically opposite recesses are horizontal and said flats are vertical when said screw-locking slider is in a locking position.

10. The improvement set forth in claim 5, wherein
said coupling bridge is movable to a lowermost position to move said screw-locking slider to said locking position and
said engaging edge portion having such a curvature that upon an initial coupling of said feed screw to said coupling section by said screw-locking slider a rotation imparted to said feed screw by said screw-driving shaft will cause said pins to run up on said engaging edge portion so as to space said pins from said engaging edge portion.

11. The improvement set forth in claim 1, wherein
said plasticizing cylinder has a rear end face that is formed with a radial groove covered by a cover, said cover having an axially extending flange that overlaps the plasticizing cylinder,
an additional cylinder-locking slider being movably mounted in said guide groove for a limited radial displacement,
said end section of said feed screw having a recess adapted to receive and interlock with said additional cylinder-locking slider, and
said additional cylinder-locking slider being biased by a spring for urging said additional cylinder-locking slider into said recess for axially and radially locating said feed screw relative to said plasticizing cylinder when said two cylinder-locking sliders and said screw-locking slider are in their unlocking positions.

12. The improvement set forth in claim 11, wherein
a second coupling bridge is secured to the said two cylinder-locking sliders and engageable with said additional cylinder-locking slider on opposite sides thereof to move the additional cylinder-locking slider to its locking position substantially simultaneously with the movement of said two cylinder-locking sliders and said screw-locking slider to their unlocking positions,
said additional cylinder-locking slider having a central aperture receiving said coupling end section of said feed screw,
said flange having an aperture,
said second coupling bridge comprising a nose for extending through said flange into engagement with an underside of said additional cylinder-locking slider,
said additional cylinder-locking slider carrying a pin protruding from a top of said additional cylinder-locking slider and
said second coupling claw comprising a leg for engaging said pin.

13. The improvement set forth in claim 11, wherein
said end section of said feed screw is formed with a recess for receiving said additional cylinder-locking slider in its locking position,
said axial flange being formed with a hole,
said additional cylinder-locking slider being formed at a top thereof with a blind bore containing a pin extending through said hole in said flange, and
a coil spring surrounding said pin in said blind bore and engaging a bottom of said blind bore and said flange and urging said additional cylinder-locking slider to its locking position.

14. The improvement set forth in claim 1, wherein
said hydraulic unlocking cylinder means consists of two hydraulic cylinders,
one of said cylinder-locking sliders being formed with two bores, which constitute cylinders proper of said unlocking cylinders,
said unlocking cylinders comprising piston rods secured to the other of said cylinder-locking sliders,
said cylinder-locking sliders being formed with radial guide grooves and
said carrying block carrying guide rods having heads guided in said guide grooves.

15. The improvement set forth in claim 1, wherein
said carrying block has a forward end face,
said plasticizing cylinder has a radial flange axially bearing on said end face,
said plasticizing cylinder has a rear end face formed with diametrically opposite locking grooves having beveled side faces and
each of said cylinder-locking sliders having segment-shaped engaging portions having beveled side faces arranged to engage said beveled side faces of said locking grooves and to force said radial flange against said end face when said cylinder-locking sliders are in their locking position.

16. The improvement set forth in claim 14, wherein
said unlocking cylinders are single-acting cylinders,
said one cylinder-locking slider comprising an outer slider part being formed with said bores, said bores comprising first blind bores, and an inner slider part being formed with second blind bores smaller in diameter than said first blind bores, said inner slider part being formed with a shoulder in each of said blind bores, each of said piston rods carrying a piston in one of said cylinders and extending through one of said second blind bores, a prestressed coil spring being disposed in each of said second blind bores between said shoulder and said piston and said coil springs urge said cylinder-locking sliders to their locking position.

17. The improvement set forth in claim 1, wherein retaining means are provided for axially retaining said plasticizing cylinder on said feed screw when said cylinder-locking sliders are in their unlocking position, and said injecting unit comprising advance-retract cylinders for retracting said carrying block so as to remove said plasticizing cylinder from said axial bore when said cylinder-locking sliders are in their locking position and said plasticizing cylinder is axially retained on said feed screw.

18. The improvement set forth in claim 17, wherein said cylinder-locking sliders have engaging portions for interlocking with said plasticizing cylinder in said locking position, and said plasticizing cylinder being adapted to be locked to said carrying block by a mechanical locking apparatus, said locking apparatus comprising two locking bars for locking said plasticizing cylinder to said block and two screws for axially forcing said locking bars against each other and said locking bars having engaging portions identical to those of said cylinder-locking sliders and adapted to interlock with said plasticizing cylinder.

* * * * *